United States Patent Office 3,483,228
Patented Dec. 9, 1969

3,483,228
METHOD FOR PRODUCING 5-HYDROXY-
METHYL FURFURAL
John D. Garber, Hinsdale, Ill., and Robert E. Jones,
North Muskegon, Mich., assignors to Merck & Co.,
Inc., Rahway, N.J., a corporation of New Jersey
No Drawing. Continuation-in-part of application Ser. No.
311,671, Sept. 26, 1963. This application Oct. 18, 1966,
Ser. No. 587,408
Int. Cl. C07d 5/22
U.S. Cl. 260—347.8                              8 Claims

ABSTRACT OF THE DISCLOSURE 5-hydroxymethyl furfural is prepared from sugars, glucose containing materials and hydrolyzed wood or starch by heating an aqueous solution of the sugar compound in the presence of an aluminum salt.

This invention relates to the production of 5-hydroxymethyl furfural, hereinafter sometimes referred to as HMF, and more particularly relates to the production of HMF from sugars. Specifically, it relates to the catalytic, high temperature, production of 5-hydroxymethyl furfural from hexoses, glucose-containing materials such as invert sugar and hydrolyzed wood or starch, and other sugars such as fructose, sucrose, fructosans, all of such sugars, glucose-containing materials and hexoses being sometimes hereinafter referred to simply as "sugars."

This application is a continuation-in-part of application Ser. No. 311,671, filed Sept. 26, 1963, now abandoned.

The present invention concerns an improvement in the production of 5-hydroxymethyl furfural from sugars and specifically concerns an improvement in the process disclosed in U.S. Patent No. 2,929,823, the entire disclosure of which is hereby incorporated into the present disclosure by reference. As taught in the aforementioned patent, 5-hydroxymethyl furfural can be obtained from sugars at temperatures above about 250° C. and preferably in the range of from 250° C. to 380° C. in high yield and in a short reaction time. The process as disclosed is effective to produce the HMF without the concurrent formation of humin, a brown-to-black polymeric material insoluble in virtually all conventional solvents. Formed instead of humin is a tarry-like material, not humin, which is easily removable by contacting the equipment with conventional solvents. In any event, the formation of this tar which supplanted the formation of humin is not undesirable. Prior to the invention with which the aforementioned patent is concerned, the preparation of 5-hydroxymethyl furfural from sugars resulted in large deposits of humin which then coated the reactor in a manner so as to insulate effectively the reaction chamber from the heat source required. Furthermore, excessive difficulties were encountered due to frequent breakdowns and cleaning operations as a result of plugged orifices and scaled equipment in general.

While the process of the aforesaid patent was effective to eliminate the formation of humin, as above indicated, certain sugars within the contemplation of the process are not as conveniently converted to HMF, nor is the yield of HMF as high as desired with certain of these sugars according to the process therein disclosed. For example, the conversion of glucose, although acceptable, was less than a desired level when compared to the conversion of fructose to the same material. The patentees, who are the same as the present inventors, disclosed that the process could be enhanced by the use of a catalyst in the conversion of sugars such as glucose, or glucose-containing materials. With respect to the catalysts disclosed and those known by the art to be operative, there may be mentioned such materials as levulinic acid, oxalic acid, other carboxylic acids, sulfuric acid, and the like.

In accordance with the present invention, it has been discovered that the conversion of sugars to 5-hydroxymethyl furfural in accordance with the process disclosed in the aforementioned patent, is greatly enhanced when the conversion is carried out in the presence of aluminum salts. Not only does the process overcome the lack of conversion efficiency attending the glucose conversion, but other sugars such as fructose, sorbitose, galactose and others are likewise amenable to the process.

As stated above, the present invention contemplates converting the sugars to 5-hydroxymethyl furfural in the presence of an aluminum salt. The aluminum salt supplies an aluminum ion and has been demonstrated to give very effective results. The particular salt which supplies the aluminum ion is immaterial with respect to the general ability of the aluminum ion to enhance the conversion of the sugars. As a general characteristic, however, those aluminum salts which are soluble in water are particularly effective in the process. Typical of such compounds are aluminum sulfate $(Al_2(SO_4)_3 \cdot 18H_2O)$, aluminum chloride $(AlCl_3)$, aluminum bromide $(AlBr_3)$, ammonium alum $(NH_4Al(SO_4)_2)$, potassium alum $(KAl(SO_4)_2)$, aluminum nitrate $(Al(NO_3)_3)$, rubidium aluminum sulfate $(RbAl(SO_4)_2)$, sodium aluminum chloride $(NaAl(Cl_4)_4)$, aluminum citrate $(Al(C_6H_5O_7))$, aluminum lactate $(Al(C_3H_5O_3)_3)$, aluminum tartrate $(Al_2(C_4H_4O_6)_3)$, aluminum acetate $(Al(C_2H_3O_2)_3)$, aluminum sulfocarbolate $(Al(C_6H_5SO_4)_3)$, and the like. Preferred among the foregoing are aluminum sulfate, ammonium aluminum sulfate, and aluminum chloride and most preferred is aluminum sulfate.

The degree of conversion of sugar to HMF effected through the use of the aluminum salt differs among the above named aluminum compounds. However, it has been found that suitable conversion results are obtained when amounts ranging up to 15% of the catalyst, based on the weight of the sugar, are used. This, however, is not critical and differing amounts may be employed when the process will be benefited thereby. In general, however, amounts exceeding the stated range produce no additional beneficial effect and are, therefore, not used. With respect to the preferred materials, the aluminum sulfate is found to be most effective when used between 1 and 5 weight percent based on the weight of the sugar employed. Aluminum chloride is best employed at about 8–12 weight percent and ammonium alum produces best results when employed at about 3–7%.

In carrying out the improved process, the same system as disclosed in the aforementioned patent is employed with the exception that somewhat broader temperature conditions (240° C. to 390° C.) are permitted here. The process is therefore best carried out under a continuous operating system but may as well be effected in a batchwise operation. Thus, for purposes of investigating the conversion of the sugars to HMF, a series of capillary tube experiments may be run in which the capillary tube is filled with an aqueous solution of the sugar, additionally containing the quantity of the catalyst, and this mixture heated to a temperature to within the range of 240° C.–390° C. for varying period of time (contact time) to effect the reaction. The conversion of the sugar to the HMF is then determined by ultraviolet absorption techniques.

A continuous operation of the process involves flowing the sugar solution into a series of tubes heated by supplying a flow of hot gas or oil or heat-transfer liquid around the tubes. The sugar solution may contain as much dissolved sugar as desired consistent with expedient handling. Desirably the sugar solution contains the desired amount of catalyst already admixed therewith, but this may be altered, if desired, by introducing the catalyst at some point prior to or during the time when the sugar solution contacts the heated tubes. It is preferred to use the former of the two, namely prior admixing.

As a result of utilizing the aluminum salts described herein, it is possible to obtain yields of HMF ranging from 40–60% in a period of time as short as from 5 to 20 seconds when using sucrose, glucose, sorbose, galactose, fructose and in general other sugar materials.

It will be appreciated by those skilled in the art that at the various levels which some of the aluminum salts are employed acidic conditions may exist which approximate the pH of catalyzed reaction mixtures wherein the catalyst is sulfuric acid, for example, or hydrochloric acid. However, the results obtained from the instant process far exceed, in terms of per cent conversion, the figures obtained when comparable tests are run using equivalent amounts of sulfuric or hydrochloric acid yielded by the stated levels of the sulfates or chlorides of aluminum. This will become apparent when consideration is given to example 6 hereinafter which demonstrates that the use of hydrochloric acid or sulfuric acid at the levels indicated do not give the correspondingly enhanced yields of HMF obtained through the use of the aluminum salt catalyst.

As a further embodiment of the invention, the aluminum salts may be used in combination with another additive to enhance further the yield of 5-hydroxymethyl furfural obtained. In general, the additives employed are acidic in character and include oxalic acid, tannic acid, sulfuric acid, N-hydroxyethylethylenediaminetriacetic acid and ethylenediaminetetraacetic acid. Best results are obtained with these additive compounds when used in conjunction with aluminum sulfate, ammonium alum ($NH_4Al(SO_4)_2$), and aluminum chloride. It is preferred that the additive compound be used in the range of from .5%–5%, based on the amount of sugar charged. The reaction may be run in the same fashion as indicated above in connection with the process wherein the aluminum salt is used without any additive. Using a further embodiment, HMF yields from glucose are obtainable in the range of from 40–52% in reaction times ranging from 9–15 seconds at about 270° C.

The following examples are given for illustration only and are not intended to limit the scope of the invention. The examples, unless otherwise indicated, were carried out in capillary tubes similar to the tubes generally used in melting point determinations by providing in the capillary tube an amount of aqueous sugar solution containing the desired amount of catalyst, sealing the ends of the tube, and heating the sample in an oil bath at the indicated temperature for the indicated length of time. The yield of HMF was determined after the tubes are quickly removed and plunged into a cold oil bath and the contents emptied into a volumetric flask. The actual 5-hydroxymethyl furfural determination was made by U.V. absorption at 2830 angstroms.

TABLE 8

Time in seconds: Yield of HMF based on sucrose, percent
5 _____ 20.4
7 _____ 38.1
9 _____ 48.9
11 _____ 50.8
13 _____ 46.4
15 _____ 41.9

The following shows yields obtained from the reaction when no oxalic acid is employed.

TABLE 8A

Time in seconds: Yield of HMF based on sucrose, percent
9 _____ 39.0
10 _____ 44.2
11 _____ 46
12 _____ 47
15 _____ 44

From the foregoing it will be observed that the oxalic acid additive has the effect of producing a higher peak yield in a shorter period of time over that system wherein no oxalic acid is employed.

EXAMPLE 9

Experiments using ammonium alum with glucose give the following HMF yields at a reaction temperature of 270° C. in the indicated reaction time.

EXAMPLE 1

A stock solution containing 25 g. of sucrose, 0.831 g. of $Al_2(SO_4)_3 \cdot 18H_2O$ is diluted to 100 cc. and held at the temperature and for a length of time indicated in Table 1, appearing below.

TABLE 1

| | Contact time, seconds | Percent HMF yield |
|---|---|---|
| Temperature, ° C.: | | |
| 1. 240 | 7.0 | 18.45 |
| 2. 240 | 10.4 | 31.7 |
| 3. 240 | 15.2 | 43.3 |
| 4. 240 | 20.4 | 48.2 |
| 5. 240 | 25.0 | 40.0 |
| 6. 290 | 1.2 | 1.84 |
| 7. 290 | 2.8 | 8.0 |
| 8. 290 | 4.2 | 26.1 |
| 9. 299 | 5.0 | 41.6 |
| 10. 290 | 62. | 49.7 |
| 11. 290 | 7.2 | 43.7 |
| 12. 290 | 7.6 | 35.2 |
| 13. 290 | 8.6 | 34.4 |
| 14. 290 | 10.2 | 33.6 |

EXAMPLE 2

The following runs are made at the indicated levels of aluminum chloride in a glucose solution at 240° C.

TABLE 2

| Catalyst Added [1] | Contact time, seconds | Percent HMF yield |
|---|---|---|
| 1. None | 5 | 0 |
| 2. None | 10 | 0.63 |
| 3. None | 15 | 0.65 |
| 4. 0.1 g. $AlCl_3$/10 g. glucose | 5 | 1.3 |
| 5. 0.1 g. $AlCl_3$/10 g. glucose | 10 | 4.8 |
| 6. 0.1 g. $AlCl_3$/10 g. glucose | 15 | 10.9 |
| 7. 1.0 g. $AlCl_3$/10 g. glucose | 5 | 10.0 |
| 8. 1.0 g. $AlCl_3$/10 g. glucose | 10 | 49.5 |
| 9. 1.0 g. $AlCl_3$/10 g. glucose | 15 | 50.0 |

[1] All "Feed" solutions made up to 100 cc.

It is apparent from the foregoing that aluminum chloride is an effective yet sensitive catalyst for the conversion. It can be seen that at the lower levels (1% catalyst based on the glucose) yields of 1.2–10.8% were obtained while for exactly the same contact times at a 10% aluminum chloride level yields of up to 50% are obtained.

EXAMPLE 3

This example demonstrates the efficacy of aluminum sulfate at various levels in the conversion of sucrose to 5-hydroxymethyl furfural. All the runs designated are in 25 g. of sucrose, plus the indicated amount of catalyst diluted to 100 cc. with the reaction taking place at 290° C.

TABLE 3

| Quantity of Al₂SO₄·18H₂O | Contact time, seconds | Percent HMF yield |
|---|---|---|
| 1. None | 15.0 | 24.2 |
| 2. None | 20.0 | 32.2 |
| 3. 0.415 g./25 g. sucrose | 6.0 | 46.0 |
| 4. 0.415 g./25 g. sucrose | 8.2 | 48.3 |
| 5. 0.415 g./25 g. sucrose | 10.2 | 41.8 |
| 6. 0.832 g./25 g. sucrose | 6.2 | 44.7 |
| 7. 0.832 g./25 g. sucrose | 7.0 | 45.3 |
| 8. 0.832 g./35 g. sucrose | 7.8 | 43.9 |
| 9. 1.661 g./25 g. sucrose | 4.0 | 32.7 |
| 10. 1.661 g./25 g. sucrose | 5.0 | 39.7 |
| 11. 1.661 g./25 g. sucrose | 6.6 | 44.0 |
| 12. 3.32 g./25 g. sucrose | 3.6 | 20.0 |
| 13. 3.32 g./25 g. sucrose | 5.0 | 31.9 |
| 14. 3.32 g./25 g. sucrose | 6.6 | 33.4 |
| 15. 6.64 g./25 g. sucrose | 4.0 | 39.4 |
| 16. 6.64 g./25 g. sucroes | 5.0 | 32.0 |
| 17. 6.64 g./25 g. sucrose | 5.0 | 40.3 |

It is abundantly clear from the foregoing that best results are obtained when the aluminum sulfate catalyst is employed at levels of about 1.5–3% based on the weight of sugar used. It is also clear that this catalyst is not as sensitive as the aluminum chloride catalyst but yields results equally as favorable.

EXAMPLE 4

The following runs show the effect of various amounts of $NH_4Al(SO_4)_2 \cdot 12H_2O$ on different sugars with respect to conversion of the sugar to HMF.

TABLE 4

| Run No. | Sugar wt. aqueous solution | Wt. percent (based on sugar) of $NH_4Al(SO_4)_2 \cdot 12H_2O$ | Reaction temperature, °C. | Contact time, (sec.) | Percent HMF yield based on sugar |
|---|---|---|---|---|---|
| 1 | 15% sucrose | 2 | 270 | 12 | 42 |
| 2 | do | 5 | 270 | 9 | 39 |
| 3 | do | 5 | 270 | 12 | 47 |
| 4 | do | 5 | 300 | 6 | 46 |
| 5 | do | 5 | 300 | 7 | 50 |
| 6 | do | 5 | 300 | 7 | 50 |
| 7 | 15% invert sugar | 5 | 270 | 10 | 44 |
| 8 | do | 5 | 270 | 11 | 46 |
| 9 | 15% glucose | 3 | 270 | 8 | 36 |
| 11 | do | 3 | 270 | 9 | 40 |
| 11 | 15% fructose | 3 | 270 | 8 | 50 |
| 12 | do | 3 | 270 | 9 | 58 |

EXAMPLE 5

The following set of experiments shows the efficacy of aluminum sulfate on various sugars for varying reaction times at 271° C. All the runs employ 3.3% aluminum sulfate $(Al_2(SO_4)_3 \cdot 18H_2O)$ based on 25.0 g. of the sugar diluted to 100 cc.

TABLE 5

| Number | Sugar | Contact time, seconds | Percent HMF |
|---|---|---|---|
| 1 | Fructose | 5.0 | 22.7 |
| 2 | do | 6.8 | 43.4 |
| 3 | do | 11.0 | 50.0 |
| 4 | do | 8.2 | 34.6 |
| 5 | Glucose | 15.2 | 42.8 |
| 6 | do | 10.0 | 43.8 |
| 7 | do | 12.0 | 42.7 |
| 8 | do | 8.0 | 30.6 |
| 9 | Sucrose | 8.0 | 30.8 |
| 10 | do | 15.0 | 42.2 |
| 11 | do | 12.2 | 39.1 |
| 12 | do | 6.0 | 24.6 |
| 13 | Sorbose | 8.4 | 27.4 |
| 14 | do | 11.0 | 36.2 |
| 15 | do | 12.6 | 29.8 |
| 16 | do | 15.0 | 34.4 |
| 17 | Galactose | 6.8 | 13.9 |
| 18 | do | 10.0 | 31.5 |
| 19 | do | 10.8 | 34.6 |
| 20 | do | 12.0 | 37.7 |

The results shown in Table 5 clearly demonstrate the effectiveness of the catalyst employed in producing peak amounts of hydroxymethyl furfural from the various sugars employed at short contact times.

EXAMPLE 6

This example is shown to demonstrate that at the levels of aluminum sulfate and aluminum chloride previously used equivalent amounts of sulfuric acid and hydrochloric acid used as the catalysts are not as efficacious and, in fact, are far inferior to the catalysts herein employed. All runs are made with 6.25 g. of glucose in 25 cc. of water with the indicated amount of acid being added thereto.

TABLE 6

| Run No. | Temp., °C. | Catalyst | Contact time, seconds | Percent HMF yield |
|---|---|---|---|---|
| 1 | 230 | 0.02 cc. conc. $H_2SO_4$/25 cc. | 70 | 11.1 |
| 2 | 230 | 0.02 cc. conc. $H_2SO_4$/25 cc. | 45 | 6.3 |
| 3 | 230 | 0.02 cc. conc. $H_2SO_4$/25 cc. | 90 | 12.8 |
| 4 | 230 | 0.06 cc. conc. HCl/25 cc. | 45 | 10.0 |
| 5 | 230 | 0.06 cc. conc. HCl/25 cc. | 60 | 31.3 |
| 6 | 230 | 0.06 cc. conc. HCl/25 cc. | 90 | 13.8 |
| 7 | 270 | 0.02 cc. conc. $H_2SO_4$/25 cc. | 15 | 14.7 |
| 8 | 270 | 0.02 cc. conc. $H_2SO_4$/25 cc. | 20 | 14.0 |
| 9 | 270 | 0.02 cc. conc. $H_2SO_4$/25 cc. | 30 | 21.3 |
| 10 | 270 | 0.06 cc. conc. HCl/25 cc. | 15 | 23.0 |
| 11 | 270 | 0.06 cc. conc. HCl/25 cc. | 20 | 28.5 |
| 12 | 270 | 0.06 cc. conc. HCl/25 cc. | 30 | 21.4 |

A comparison between the yields and contact times here and those obtained in previous examples show a clear superiority of aluminum salt and catalysts and adequately demonstrates that the presence of the aluminum ion is necessary.

EXAMPLE 7

Table 7 shows the effect of various aluminum salts used at the 5% by weight level based on the sugar at 270° C. The feed composition is 15 g. sucrose plus catalyst diluted to 100 cc. with water.

TABLE 7

| Catalyst wt. percent based on sugar | Contact time, seconds | Peak Percent HMF yield |
|---|---|---|
| Run No.: | | |
| 1 _____ $KAl(SO_4)_2$ (5%) _____ | 13 | 47.8 |
| 2 _____ $Al(NO_3)_3$ (5%) _____ | 8 | 40.4 |
| 3 _____ Aluminum citrate (5%) _____ | 15 | 41.50 |

Similar results are obtained when cesium aluminum sulfate, rubidium aluminum sulfate, sodium aluminum chloride, aluminum bromide, and aluminum tartrate are used as the aluminum salt in the foregoing procedure.

EXAMPLE 8

A solution of 15 g. of sucrose, 0.75 g. of $$NH_4Al(SO_4)_2 \cdot 12H_2O$$

and 0.2 g. of oxalic acid in 100 ml. of water are treated as in the foregoing example at a temperature of 270° C. The following table demonstrates the results obtained.

TABLE 9

| Catalyst | Peak yield of HMF, percent | Reaction time, seconds |
|---|---|---|
| Ammonium alum, $NH_4Al(SO_4)_2$ 1% based on glucose in combination with oxalic acid (1.25% based on glucose) | 45 | 15 |
| Ammonium alum 3% based on glucose in combination with oxalic acid (1.25% based on glucose) | 52 | 9 |
| Ammonium alum 5% based on glucose in combination with N-hydroxethylethylenediaminetriacetic acid (4% based on glucose) | 40 | 9 |
| Ammonium alum 5% based on glucose in combination with N-hydroxyethylethylenediaminetriacetic acid (4% based on glucose) | 46 | 14 |
| Aluminum alum 3% based on glucose in combination with N-hydroxyethylethylenediaminetriacetic acid (3.3% based on glucose) | 67 | 4–6 |

Similar results are obtained when ethylenediaminetetraacetic acid is used in place of N-hydroxyethylethylenediaminetriacetic acid.

EXAMPLE 10

The following table demonstrates the conversion of sucrose to HMF using aluminum sulfate in combination with sulfuric acid. A stock solution of 25% sucrose, 2.5 g. of $Al_2(SO_4)_3 \cdot 18H_2O$ in 0.07N $H_2SO_4$ are heated at 240° C. with the following results:

TABLE 10

| | Contact time, seconds | HMF Yield, percent |
|---|---|---|
| Temperature: | | |
| 1. 240° C. | 5.4 | 17.7 |
| 2. 240° C. | 10.2 | 43.9 |
| 3. 240° C. | 12.4 | 47.1 |
| 4. 240° C. | 16.2 | 41.0 |

EXAMPLE 11

The use of cane juice, either dried or as expressed from sugar cane, gives best results when acid is added to the aluminum salt catalyst. This is believed to be due to buffering action of other components in cane juice. A similar situation could apply to hydrolyzed wood waste, bagasse, or the like. The following experiments are carried out at 270° C.

TABLE 11

| Sugar | Catalyst | Contact time (sec.) | Yield of HMF, percent |
|---|---|---|---|
| Dried Cane Juice | $Al_2(SO_4)_3 \cdot 18H_2O$, 3% on solids | 12 | 17.2 |
| Do | do | 16.2 | 23.9 |
| Do | $Al_2(SO_4)_3 \cdot 18H_2O$, 3% on solids plus 1.15% conc. $H_2SO_4$ | 14.0 | 42.5 |
| Do | $Al_2(SO_4)_3 \cdot 18H_2O$, 3% on solids plus 4.6% conc. $H_2SO_4$ | 8.0 | 44.3 |
| Do | do | 7.0 | 35.8 |
| Fresh Cane Juice | $Al_2(SO_4)_3 \cdot 18H_2O$, 208 mg. in 25 ml. juice | 16.0 | 17.4 |
| Do | $Al_2(SO_4)_3 \cdot 18H_2O$, 208 mg. plus 0.20 ml. conc. $H_2SO_4$ | 7.8 | 37.3 |

EXAMPLE 12

As examples of the other acids which may be employed in conjunction with aluminum salt catalysts, the following are illustrative:

TABLE 12

| Reaction temp., ° C. | Feed Composition | Contact time (sec.) | Percent yield of HMF |
|---|---|---|---|
| 271 | Stock solution (a) | 9.2 | 35.2 |
| 271 | 25 ml. a+30 mg. $Cl_3CCOOH$ | 7.0 | 26.1 |
| 271 | 25 ml. a+60 mg. p-toluene sulfonic acid | 7.2 | 29.2 |
| 271 | 25 ml. a+36 mg. $F_3CCOOH$ | 9.0 | 33.2 |
| 265 | Stock solution (b) | 8.2 | 46.0 |
| 265 | 100 ml. (b)+1.2 g. $CuSO_4 \cdot 5H_2O$ | 5.0 | 35.0 |

(a) Stock solution composed of 6.25 g. glucose, 0.21 g. $Al_2(SO_4)_3 \cdot 18H_2O$, water to 25 ml.
(b) Stock solution composed of 35 g. sucrose, 0.831 g. $Al_2(SO_4)_3 \cdot 18 H_2O$, water to 100 ml.

Similar results are obtained when using tannic acid in place of trifluoroacetic acid.

EXAMPLE 13

This example demonstrates the continuous production and conversion of HMF from the sugar solutions and is applicable to any of the foregoing examples desired to be carried out in a continuous fashion.

A tubular reactor is constructed of several lengths of ⅜ inch O.D. stainless steel tubing surrounded by a shell. Heat is supplied to the tubing by Dowtherm vapor applied to the jacket. Other equipment includes various high pressure pumps, pressure and temperature controllers and a flash chamber. The contact time is varied by making adjustments in the pumping rate or by adding or subtracting the necessary lengths of tubing.

A solution of 15% sucrose in water containing as a catalyst 0.4% aluminum sulfate $(Al_2(SO_4)_3 \cdot 18H_2O)$ is passed through the above reactor. Contact time at 265–275° C. is 8 seconds. The cooled reaction product is extracted with 3×1 volumes of methylene chloride, the organic phases combined and concentrated. The residue is distilled to give rather pure HMF (B.P. 112–115° C. at 0.1 mm., $n_D^{25}$=1.5590) in a yield of 30% based on the sucrose charged. Recycle of the sugars remaining, about 2.5:1 glucose:fructose ratio, using a higher reaction temperature, larger contact time or increased catalyst concentration plus acid increases the overall yield to over 50%.

What is claimed is:

1. In the process for producing 5-hydroxymethyl furfural from a compound of the group consisting of hexoses, invert sugar, sucrose, fructosans, hydrolyzed wood and starch, that comprises heating an aqueous solution of the compound at a temperature between 240 and 390° C. for from about 5 to 20 seconds, the improvement that comprises conducting said process in the presence of an aluminum salt.

2. The process of claim 1 wherein said aluminum salt is selected from the group consisting of aluminum sulfate, aluminum chloride, ammonium alum, potassium alum, aluminum nitrate, aluminum citrate, cesium aluminum sulfate, rubidium alumimun sulfate, sodium aluminum chloride, aluminum bromide and aluminum tartrate.

3. The process of claim 1 wherein said aluminum salt is aluminum sulfate, and is present in an amount from about 1 to 3% by weight of sugar.

4. The process of claim 1 wherein said aluminum salt is aluminum chloride, and is present in an amount from about 8–12% by weight of sugar.

5. The process of claim 1 wherein said aluminum salt is aluminum alum, and is present in an amount from about 3–7% by weight of sugar.

6. The process of claim 1 wherein the aqueous sugar solution contains in addition to the aluminum salt an acid catalyst selected from the group consisting of oxalic acid, tannic acid, sulfuric acid, N-hydroxyethylethylenediaminetriacetic acid, ethylenediaminetetracetic acid, trifluoroacetic acid, trichloroacetic acid, p-toluene sulfonic acid, and copper sulfate.

7. The process of claim 1 wherein the sugar is glucose.

8. The process of claim 7 wherein said aluminum salt is aluminum sulfate which is present in an amount of from 0.5 to 5% by weight of the glucose.

References Cited

UNITED STATES PATENTS

| | | | |
|---|---|---|---|
| 2,750,394 | 6/1956 | Penniston | 260—347.8 |
| 2,929,823 | 3/1960 | Garber | 260—347.8 |

OTHER REFERENCES

Haworth: Journal. Chem. Soc., p. 667 (1944).

E. G. V. Percival: Structural Carbohydrate Chemistry, J. Garnet Miller LTD, London pp. 1–2 (1962).

ALEX MAZEL, Primary Examiner

BERNARD I. DENTZ, Assistant Examiner